United States Patent
Franke et al.

(10) Patent No.: US 6,349,998 B1
(45) Date of Patent: Feb. 26, 2002

(54) METHOD OF CONTROLLING THE TRAVEL BEHAVIOR OF A VEHICLE

(75) Inventors: Torsten Franke; Klaus Gläbe, both of Hannover; Ralf Koschorek, Ronnenberg; Thomas Reich, Hannover, all of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/426,256

(22) Filed: Oct. 25, 1999

(30) Foreign Application Priority Data

Oct. 27, 1998 (DE) .......................... 198 49 508

(51) Int. Cl.$^7$ ............................... B60T 8/60
(52) U.S. Cl. ........................ 303/148; 303/147
(58) Field of Search ................. 303/146, 147, 303/140, 148

(56) References Cited

U.S. PATENT DOCUMENTS

| | | | | |
|---|---|---|---|---|
| 4,898,431 A | * | 2/1990 | Karnopp et al. | 303/110 |
| 4,998,593 A | * | 3/1991 | Karnopp et al. | 303/96 |
| 5,082,333 A | | 1/1992 | Fukushima | |
| 5,341,297 A | * | 8/1994 | Zomotor et al. | 303/103 |
| 5,645,326 A | * | 7/1997 | Sano | 303/146 |
| 5,704,695 A | * | 1/1998 | Monzaki et al. | 303/146 |
| 5,774,821 A | | 6/1998 | Eckert | |
| 6,003,959 A | * | 12/1999 | Katayose et al. | 303/146 |

FOREIGN PATENT DOCUMENTS

| | | | | |
|---|---|---|---|---|
| DE | 4016668 | | 11/1990 | |
| DE | 195 35 623 A1 | | 4/1996 | |
| DE | 19515051 | | 5/1996 | |
| DE | 196 26 395 A1 | | 1/1997 | |
| DE | 196 34 188 A1 | | 2/1997 | |
| DE | 19626395 | * | 7/1997 | 303/146 |
| DE | 19634188 | * | 4/1998 | 303/146 |
| DE | 198 14 889 A1 | | 10/1998 | |

* cited by examiner

Primary Examiner—Robert J. Oberleitner
Assistant Examiner—Devon Kramer
(74) Attorney, Agent, or Firm—Proskauer Rose LLP

(57) ABSTRACT

A method of controlling travel behavior of a vehicle provides assistance to the driver of the vehicle before the occurrence of travel conditions which are difficult to control. A vehicle taking a curve tends not to follow the travel curve indicated by steering, often resulting in understeering as the travel speed increases. At very high speeds in a curve, such behavior can lead to conditions that are difficult for the driver to control. Rather than intervening when an unstable travel state is already present and control of the vehicle rendered difficult, as practiced in conventional systems and processes for the regulation of travel dynamics, the wheel brake of a rear wheel of the vehicle on the inside of the curve is already subjected to a weak braking force when a relatively minor tendency to understeer occurs, so that the understeering tendency is reduced or eliminated.

10 Claims, 1 Drawing Sheet

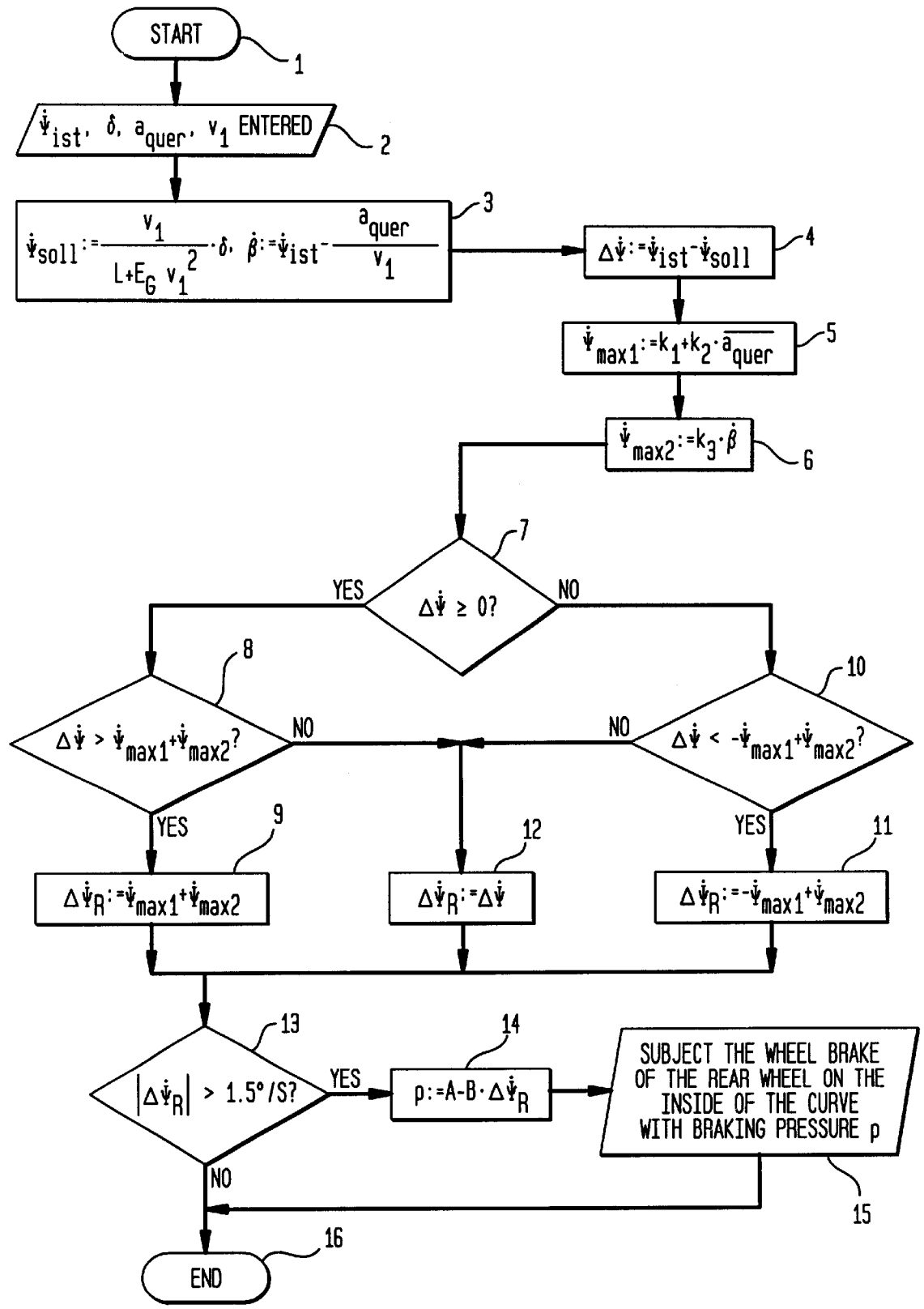

METHOD OF CONTROLLING THE TRAVEL BEHAVIOR OF A VEHICLE

BACKGROUND OF THE INVENTION

The invention relates to a method of controlling travel behavior of a vehicle, and more particularly, to a method in which control of vehicle travel behavior is based upon a comparison of an actual measured yawing angle speed of the vehicle with a target yawing angle speed which can be influenced by the driver of such vehicle.

A method of this type, referred to generally as a process for the control of travel dynamics, is disclosed, for example, in German patent application DE 195 15 051 A1 (U.S. Pat. No. 5,774,821), and which is incorporated herein by reference.

In accordance with the known method, an additional yawing moment is produced in a motor vehicle through actuation of individual wheel brakes, for the intended purpose of effecting stabilization of unstable travel behavior, for example, skidding, or strong oversteering or understeering.

In the known method, control intervention is initiated only when the vehicle is already in a unstable, and hence difficult to manage, travel state. In this state, the unstable travel behavior can be further aggravated by an incorrect reaction by the driver, for example, a steering correction that excessively attempts to counteract the skidding motion, thus rendering stabilizing control of the travel behavior even more difficult.

It is therefore the object of the present invention to provide a method of controlling the travel behavior of a vehicle which permits facilitated control of such vehicle, even when operated by an inexperienced driver, particularly when negotiating a curve.

SUMMARY OF THE INVENTION

In accordance with these and other objects of the invention, there is provided a method of controlling the travel behavior of a vehicle in which an actually measured yawing angle speed is compared with a target yawing angle speed influenced by a driver of the vehicle to determine a deviation therebetween. A wheel brake of a wheel located on the inside of the curve travelled by the vehicle is then subjected to a braking force, prior to an occurrence of an unstable travel state, when the actual yawing angle speed deviates from the target yawing angle speed by at least a predetermined amount, such that a reduction in the deviation of the actual yawing angle speed from the target yawing angle speed is achieved. It is further advantageous to limit the deviation between the target yawing speed and the actual yawing angle speed to a limited deviation, which is included within an admissible value range determined as a function of a transversal acceleration of the vehicle, and to derive the braking force based upon the limited deviation. In such manner, at least one wheel brake is subjected to the braking force derived from the limited deviation to assist in stabilization of the traveling behavior.

A first embodiment of the invention is based on the principle that, when entering a curve, a vehicle having a steerable axle transmits relatively large lateral guiding forces to the wheels of the steerable axle due to the steering deflection, while considerably lesser lateral guiding forces are transmitted to a non-steerable axle of the vehicle. When the maximum lateral guiding force, the value of which depends on the frictional values present, is exceeded, such a vehicle displays an understeered traveling behavior that would worsen with increasing travel speed, without application of the invention, i.e. the wheels of the steerable axle would slip. In such a travel state, the available maximum lateral guiding force on the wheels of the non-steered axle would not, however, as yet, been utilized.

By employing an advantageous embodiment of the invention, an even distribution of the lateral guiding forces acting upon the vehicle axles is already achieved upon detection of slightly understeered travel behavior, in advance of the occurrence of an unstable travel situation, for example, before the above-mentioned sliding of the wheels of the steerable axle. This is accomplished by subjecting the wheel brake of a wheel located on the inside of the curve, preferably the rear wheel, to a relatively low braking force adapted to the current degree of understeering. As a result, an additional yawing moment is produced about the vertical axis of the vehicle so that the rotation of the vehicle into the curve is assisted and the tendency for understeering thereby reduced. In this manner, the driver is actively aided even before the occurrence of a travel state which would be difficult or impossible to control, and the lateral guiding capability of the entire vehicle is improved on the steerable axle and on a non-steerable axle, through the adaptation of the slip angles.

To determine the braking force to which the wheel brake is to be subjected, the existing understeering tendency, i.e. the difference between a target yawing angle speed indicated by the steering action by the driver and an actual yawing angle speed determined by means of a suitable sensor, is employed in an advantageous further development of the invention.

In known processes for the control of travel dynamics, assisted control is normally triggered only when an understeering tendency of approximately −3 degrees/second is detected, i.e. the adjustment of the travel behavior begins when the actual yawing angle speed drops below the target yawing angle speed by at least 3 degrees/second. In this state, the vehicle is already difficult or impossible to control, depending on the driver's ability. In an advantageous further development of the invention, the control of travel behavior is already initiated when an understeering tendency of approximately 1.5 degrees/second is detected, since it has been generally found that an understeering tendency of such magnitude can be satisfactorily overcome even by an inexperienced driver.

In a second embodiment of the invention, the deviation of the actual yawing angle speed from the target yawing angle speed is determined, and at least one wheel brake is subjected to a braking force derived from the aforementioned deviation in order to stabilize the travel behavior. In accordance with such embodiment, the above determined deviation is advantageously limited to a value which is lies within an admissible value range, for purposes of effecting the stabilizing adjustment. The admissible value range is determined as a function of the transversal acceleration of the vehicle. Since the driver, by steering of the vehicle, is able to select target yawing angle speeds which cannot be effectively transmitted by the vehicle to the road surface because of the particular physical conditions present, and which may lead instead to an undesirable, unstable travel behavior, even with appropriate assistance through control intervention, influence exerted by the driver upon the production of an additional yawing speed is therefore limited by the second embodiment of the invention to values which are plausible and usable in practice. In an especially advantageous manner, this second embodiment of the invention can be used for the stabilization of understeered travel behavior, as well as for the stabilization of oversteered travel behavior.

The transversal acceleration of the vehicle can be measured for the above purpose by means of a suitable sensor, or can be calculated in a manner familiar to a person schooled in the art on the basis of other parameters which can be detected in the vehicle, such as, for example, the steering angle and the rotational speed of individual wheels.

It is also particularly advantageous to combine the first and the second embodiments of the invention. In such manner, the vehicle can be operated very easily and safely, even in extreme travel situations.

In another advantageous further development of the invention the admissible value range of the deviations between the target yawing angle speed and the actual yawing angle speed which is evaluated for control purposes is shifted by an amount which depends on the calculated floating angle speed, i.e. the difference between the actual yawing angle speed and a yawing angle speed which is actually to be expected based on the transversal acceleration. The shift is preferably such that the steering movement executed by the driver in the correct direction, i.e. steering movements which contribute to a stabilization of the travel behavior in the sense of a reduction of the difference between the target yawing angle speed and the actual yawing angle speed through a reduction of the floating angle, may result in a widening of the limit of the admissible value range relevant for this case. Steering movements in the wrong direction, on the other hand, cause a reduction of the limits of the admissible value range which are relevant therefore. By shifting the admissible value range, one limit is expanded and the other limit is restricted thereby in a simple manner. In other words, as a result of the shift of the admissible value range, the wheel brake of the rear wheel inside the curve can be subjected to a greater braking force in the event, for example, of a steering movement by the driver in the correct direction, than in the instance of a wrong steering movement or no steering movement at all. This furthermore imparts a more secure driving impression to the driver.

The above, and other objects, features and advantages of the present invention will become apparent from the following description read in conjunction with the accompanying drawing.

BRIEF DESCRIPTION OF THE FIGURES

FIG. 1 is a flow chart representing schematically the steps of the method for controlling the travel behavior of a vehicle in accordance with an embodiment of the invention.

DETAILED DESCRIPTION OF THE PREFERRED EMBODIMENT

With regard to the method described below, it is to be assumed that such method is used in a vehicle equipped as follows:

At least one yawing angle speed sensor is provided to measure the actual yawing angle speed $\dot{\Psi}_{ist}$ of the vehicle. The term "yawing angle speed" is understood herein to be the rotation of the vehicle around its vertical axis per unit time.

In addition, a steering angle sensor is provided to measure the steering angle $\delta$ selected by the driver. The term "steering angle" is understood herein to be the angular deviation of steerable wheels from a position parallel to the longitudinal axis of the vehicle, rather than the angle of rotation of the steering wheel.

Furthermore, a speed sensor is provided to determine the longitudinal vehicle speed $v_1$, i.e. the speed in the direction of travel. It is also possible to calculate the longitudinal travel speed $v_1$ from the signals of sensors used to measure the rotational speed of wheels, such as those used for anti-locking systems in determining a reference speed. A process of this type is described, for example, in German patent document DE 40 16 668 A1, which is incorporated herein by reference.

Also, a transversal acceleration sensor is provided to determine the transversal acceleration $a_{quer}$ of the vehicle.

In addition to the above, the vehicle is furthermore equipped with a braking system which utilizes a pressure-medium-actuated wheel brake at each wheel, which exerts a braking pressure upon an assigned wheel when subjected to a braking pressure p. Instead of using pressure media, the wheel brakes can also be actuated by an electrical actuating element, for example, an electric motor.

An electronic control device is furthermore provided for processing the sensor signals and producing actuating signals for the wheel brakes. In order to prevent undesirable travel conditions, such as understeering and oversteering or slipping, the electronic control device carries out the method according to the invention which is provided in the form of various control algorithms as part of a control program. A vehicle equipped with such components is also referred to as a "travel stability regulating vehicle."

Referring now to FIG. 1, the method schematically represented therein is executed cyclically by the electronic control device as part of a control program. It starts with a block 1. The magnitudes, including target yawing angle speed $\dot{\Psi}_{ist}$, steering angle $\delta$, transversal acceleration $a_{quer}$ and longitudinal vehicle speed $v_1$, each being detected, respectively, by the various sensors described above, are entered in a downstream input/output block 2.

The target yawing angle speed $\dot{\Psi}_{soll}$, as well as the floating angle speed $\dot{\beta}$, are calculated from the previously entered magnitudes $\delta$, $a_{quer}$, $v_1$. Other vehicle-specific magnitudes are calculated according to the following formulae:

$$\dot{\Psi}_{soll} := \frac{v_1}{L + E_G \cdot v_1^2} \cdot \delta \qquad [1]$$

$$\dot{\beta} := \dot{\Psi}_{ist} - \frac{a_{quer}}{v_1} \qquad [2]$$

Here, L and $E_G$ are magnitudes which depend on the vehicle geometry, wherein L indicates the wheelbase and $E_G$ the initial guidance gradient. The initial guidance gradient $E_G$ is a vehicle constant for any given travel situation considered, which can be determined in a vehicle with two axles according to the following equation:

$$E_G := \frac{m_{Fzg} \cdot (C_h \cdot L_h - C_v \cdot L_v)}{L \cdot C_v \cdot C_h} \qquad [3]$$

Here, $m_{Fzg}$ represents the vehicle mass, $L_h$ the distance between the rear axle and the center of gravity of the vehicle, $L_V$ the distance between the front axle and the center of gravity of the vehicle, $C_V$ the slip angle rigidity of the front axle and $C_h$ the slip angle rigidity of the rear axle. These magnitudes must be empirically determined through tests, and are vehicle-specific. For a precise definition of the magnitudes mentioned above, refer to German industrial standard DIN 77000 of January 1994.

The difference between the actual yawing angle speed $\dot{\Psi}_{ist}$ and the target yawing angle speed $\dot{\Psi}_{soll}$ is determined in a processing block 4 by calculating a difference therebetween in the form of a differential yawing angle speed $\Delta\dot\Psi$:

$$\Delta\dot\Psi := \dot\Psi_{ist} - \dot\Psi_{soll} \quad [4]$$

By using the differential yawing angle speed $\Delta\dot\Psi$ determined in this manner, the force of the regulating intervention for the reduction of the understeered travel behavior is determined in a manner described in further detail below. Since stable travel conditions can only be maintained when the yawing angle speed is below a certain maximum amount because of the physical characteristics of the vehicle and of the road surface, as mentioned above, the regulating intervention derived on the basis of the differential yawing angle speed $\Delta\dot\Psi$, should advantageously not result in a value exceeding this maximum amount. As such, not all values of the differential yawing angle speed $\Delta\dot\Psi$ are suitable for use in regulating intervention. For this reason, an admissible value range $-\dot\Psi_{max1}, \dot\Psi_{max1}$ is selected, in which the upper and lower limit values are identical in amount.

The upper limit value $\dot\Psi_{max1}$ is calculated in a processing block 5 according to the following formula:

$$\dot\Psi_{max1} := k_1 - k_2 \cdot \overline{a_{quer}} \quad [5]$$

Here the constants $k_1$, $k_2$ represent vehicle-specific magnitudes, each of which must be determined empirically. Examples of suitable values are, $k_1=5$ degrees/second and $k_2=0.3$ degrees·second/meter. The magnitude $\overline{a_{quer}}$ are presents a mean value of the transversal acceleration $a_{quer}$ obtained by averaging the transversal acceleration $a_{quer}$ over time.

The admissible value range $-\dot\Psi_{max1}, \dot\Psi_{max1}$ may, as mentioned above, be shifted as a functions of the floating angle speed $\dot\beta$. For such purpose, a shift value $\dot\Psi_{max2}$ is calculated in a subsequent process block 6 according to the following formula:

$$\dot\Psi_{max2} := k_3 \cdot \dot\beta \quad [6]$$

The constant $k_3$ must be determined specifically for each vehicle, i.e. through tests. A suitable value, however, is $k_3=0.25$.

The resulting limits of the admissible value range are then obtained by adding the portion $-\dot\Psi_{max1}, \dot\Psi_{max1}$ determined on the basis of the transversal acceleration and the shift value $\dot\Psi_{max2}$, with the sums resulting in an upper limit value $\dot\Psi_{max1}+\dot\Psi_{max2}$ and a lower limit value $-\dot\Psi_{max1}+\dot\Psi_{max2}$.

In a decision block 7, the sign of the differential yawing angle speed $\Delta\dot\Psi$ is then evaluated. If the sign is positive, i.e. if the differential yawing angle speed $\Delta\dot\Psi$ is greater than or equal to zero, subsequent blocks 8, 9 or 12 are executed. In case of a negative sign, on the other hand, blocks 10, 11 or 12 are executed.

In the decision block 8, a determination is made whether the differential yawing angle speed $\Delta\dot\Psi$ exceeds the admissible value range, the upper limit value of which is determined by the expression $\dot\Psi_{max1}+\dot\Psi_{max2}$. If this is found to be the case, a deviation $\Delta\dot\Psi_R$ used for the regulation, also referred to as limited deviation, is set to this upper limit value $\dot\Psi_{max1}+\dot\Psi_{max2}$ in processing block 9. If the upper limit value $\dot\Psi_{max1}+\dot\Psi_{max2}$ is not exceeded, the deviation $\Delta\dot\Psi_R$ used for the regulation is set to the originally determined value of the differential yawing angle speed $\Delta\dot\Psi$ in decision block 12. The program then continues to a decision block 13.

If the sign of the differential yawing angle speed $\Delta\dot\Psi$ is negative, a determination is then made as to whether the differential yawing angle speed $\Delta\dot\Psi$ is less than the lower limit value of the admissible value range, defined by the expression $-\dot\Psi_{max1}+\dot\Psi_{max2}$, in a manner similar to that described above for decision block 10. In the event that it is below the lower limit value, the deviation $\Delta\dot\Psi_R$ used for the regulation is set to this lower value $-\dot\Psi_{max1}+\dot\Psi_{max2}$ in processing block 11. Otherwise the program branches also off to the decision block 12 in which the deviation $\Delta\dot\Psi_R$ to be evaluated for the regulation is set to the original value of the differential yawing angle speed $\Delta\dot\Psi$. The program then branches off to the decision block 13.

A determination is then made in decision block 13 whether a sufficient understeering tendency is present to begin a regulating intervention, i.e. whether the deviation At to be evaluated for the regulation exceeds a value in the amount of 1.5 degrees/second. If such is not the case, the process ends with a block 16.

Otherwise, the program branches off to a decision block 14 in which a braking pressure p, suitable for the production of an additional yawing moment which assists the driver in negotiating a curve, is determined from the deviation $\Delta\dot\Psi_R$ which is to be evaluated for effecting regulation. The determination is made in accordance with the following formula:

$$p := A - B \cdot \Delta\dot\Psi_R \quad [7]$$

The magnitudes A, B represent vehicle-specific or brake-system-specific parameters which must be empirically determined for a vehicle or a braking system by tests.

In a data transfer block 15, the previously calculated braking pressure p is transmitted to an actuator for the actuation of the wheel brake. As a result, the wheel brake of the rear wheel on the inside of the curve is subjected to the braking pressure p.

The process ends with a block 16.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method of controlling travel behavior of a vehicle, comprising:
    determining a deviation of a measured actual yawing angle speed from a target yawing angle speed influenced by a driver of the vehicle;
    limiting the deviation between the target yawing angle speed and the actual yawing angle speed to a limited deviation included within an admissible value range which is determined as a function of a transversal acceleration of the vehicle;
    deriving a braking force based upon the limited deviation; and
    subjecting at least one wheel brake to the braking force derived from the limited deviation to assist in stabilization of the traveling behavior.

2. A method according to claim 1, further comprising:
    shifting the admissible value range by a shift value which is a function of a floating angle speed.

3. A method according to claim 1, further comprising:
    detecting a steering angle selected by the driver of the vehicle; and calculating the target yawing angle speed by using the steering angle.

4. A method according to claim 1, wherein said at least one wheel brake corresponds to a wheel on an inside of a curve travelled by the vehicle.

5. A method according to claim 4, wherein the wheel on the inside of the curve which is subjected to the braking force is a rear wheel.

6. A method according to claim 1, wherein said step of subjecting is initiated when the actual yawing angle speed deviates from the target yawing angle speed by at least about 1.5 degrees/second.

7. A method of controlling travel behavior of a vehicle, comprising:

comparing a measured actual yawing angle speed with a target yawing angle speed influenced by a driver of the vehicle to determine a deviation therebetween;

limiting the deviation between the target yawing angle speed and the actual yawing angle speed to a limited deviation included within an admissible value range which is determined as a function of a transversal acceleration of the vehicle;

deriving a braking force based upon the limited deviation; and subjecting at least one wheel brake to the braking force derived from the limited deviation to assist in stabilization of the traveling behavior prior to an occurrence of an unstable travel state, when the actual yawing angle speed deviates from the target yawing angle speed by at least a predetermined amount.

8. A method according to claim 7, wherein said step of subjecting is initiated when the actual yawing angle Red deviates from the target yawing angle speed by at least about 1.5 degrees/second.

9. A method according to claim 7, wherein the admissible value range includes an upper limit value and lower limit value which have different signs and are substantially identical in amount.

10. A method according to claim 7, further comprising:

shifting the admissible value range by a shift value which is a function of a floating angle speed.

* * * * *